US006422709B1

(12) United States Patent
Panagiotou

(10) Patent No.: US 6,422,709 B1
(45) Date of Patent: Jul. 23, 2002

(54) COMBINATION LIGHT ASSEMBLY

(76) Inventor: George Panagiotou, 409 Calla San Pablo, #105, Camarillo, CA (US) 93010

(*) Notice: Subject to any disclaimer, the term of this patent is extended or adjusted under 35 U.S.C. 154(b) by 0 days.

(21) Appl. No.: 09/536,816

(22) Filed: Mar. 28, 2000

(51) Int. Cl.[7] ................................................ G03B 15/02

(52) U.S. Cl. ............................... 362/16; 362/7; 362/18; 362/298; 362/301; 362/346; 362/374

(58) Field of Search ............................ 362/16, 18, 298, 362/301, 346, 374, 7

(56) References Cited

U.S. PATENT DOCUMENTS

| | | | | |
|---|---|---|---|---|
| 3,148,834 A | | 9/1964 | Boehnke | 240/41.35 |
| 3,692,399 A | * | 9/1972 | Stewart | 353/27 |
| 3,893,211 A | * | 7/1975 | Skinner | 24/221 K |
| 4,075,472 A | | 2/1978 | Higuchi | 362/255 |
| 4,144,556 A | | 3/1979 | Bond | 362/16 |
| 4,146,918 A | | 3/1979 | Tureck | 362/16 |
| 4,288,844 A | | 9/1981 | Fisher et al. | 362/33 |
| 4,517,631 A | | 5/1985 | Mullins | 362/346 |
| 4,748,543 A | | 5/1988 | Swarens | 362/147 |
| 4,947,292 A | | 8/1990 | Vlah | 362/32 |
| 4,956,759 A | | 9/1990 | Goldenberg et al. | 362/297 |
| 5,075,827 A | | 12/1991 | Smith | 362/221 |
| 5,640,284 A | | 6/1997 | Tanitsu et al. | 359/869 |
| 5,812,246 A | | 9/1998 | Claes et al. | 355/99 |
| 5,887,969 A | | 3/1999 | Gordin | 362/347 |

* cited by examiner

*Primary Examiner*—Stephen Husar
*Assistant Examiner*—Guiyoung Lee
(74) *Attorney, Agent, or Firm*—Kenneth J. Hovet

(57) ABSTRACT

A combination light assembly includes a light source within a casing that is detachably mounted to a housing with a quick connect assembly. The housing has a curved rear wall and a front area having an upper opening and a lower opening. The casing is mounted to the housing so that the light source will emit light into the housing through the lower opening for reflection off the curved rear wall and out the upper opening. The quick connect assembly comprises posts extending from the casing and connector plates positioned behind attachment openings in a framework that encloses a portion of the front area. The connector plates have flex openings that expand to engage the posts. The casing is attached by moving the posts through the attachment openings and into the flex openings.

19 Claims, 4 Drawing Sheets

COMBINATION LIGHT ASSEMBLY

FIELD OF THE INVENTION

The present invention pertains generally to lighting devices. More specifically, the present invention pertains to lighting devices which can selectively illuminate a photography/videotape subject either directly, by radiating a flood light directly onto the subject, or indirectly, by reflecting light beams off a surface and onto the subject to create a "softer" lighting effect.

BACKGROUND OF THE INVENTION

It is well known that light sources are useful for providing background lighting for photography or for videotaping purposes. For these applications, it is sometimes desired to illuminate the subject to be photographed/videotaped by radiating a light source directly on the subject. This is generally known as using a "flood" lighting effect. In other situations, it is sometimes desired to "soften" the light by illuminating the subject indirectly. Specifically, the light source is first directed onto a reflective surface for further reflection onto the subject. This causes the soft lighting effect.

Typically, different light sources are used to provide the different lighting effects. This is because lighting systems are usually capable of providing only one type of lighting effect, but not the other. Oftentimes, however, a videotape/photography process requires both types of light at different points in the process. In these cases, it can be very inconvenient to stop the process, remove one set of lights and install a different type of lighting. What is desired is a single light source that provides both flood (direct) and soft (indirect) lighting effects, as well as a manner of easily switching back and forth between the two types of effects.

U.S. Pat. No. 5,115,384 which issued to Loth et al. for an invention entitled "Soft Light", makes use of a light source and a housing to provide soft light for an object. In Loth et al., however, the light source is mounted within the housing and is not easily removable for use as a flood light. U.S. Pat. No. 5,072,350, which issued to Lowell et al. for an invention entitled "Shadow Control System", uses a panel with clamps for quickly disconnecting a shadow control system from a light. Lowell, however, does not teach or suggest the use of a removable flood light in combination with a curved reflective wall for providing soft light to illuminate a subject.

In view of the above, it is an object of the present invention to provide a combination light assembly which can effectively provide either direct or indirect illumination of a subject. It is another object of the present invention to provide a combination light assembly which allows for selection between a flood lighting and a soft lighting mode of operation. It is another object of the present invention to provide an assembly having a single light source which can quickly and easily be manipulated in order to switch back and forth between soft lighting and flood lighting. It is another object of the invention to present an assembly that provides cost savings to a user and is relatively easy to manufacture in a cost effective manner.

SUMMARY OF THE INVENTION

The light assembly in accordance with the present invention includes a reflector means, a light source and a quick disconnect means. The reflector means comprises a housing formed with a rear reflective wall, opposing side walls and a front area with an inner frame. The rear wall is curved and continuous, with its front area having an upper opening and a lower opening which is located within the inner frame. The upper and lower openings are in alignment with the rear wall to effectively direct, receive and reflect light from the light source to an object to be illuminated.

The light source, such as an electrically activated gas, filament or crystal in a bulb or tube, is contained within a casing which is detachably connected to the housing with the quick connect means. The light source and casing are positioned so that light beams radiating therefrom are directed into the housing through the lower opening. The light beams are then reflected from the curved rear wall and pass through the upper opening and out of the housing.

The quick connect means includes post and fastener components that are attached to one of either the housing or the light source casing. The fastener component comprises a connector plate with a pair of flexible cantilevered legs that releasably engage the post component. The connected overall combination or the individual housing and casing may be adjustably attached to conventional light support means such as tripods, stands, clamps, brackets, vise and clip mechanisms for their intended purposes.

BRIEF DESCRIPTION OF THE DRAWINGS

The novel features of this invention will be best understood from the accompanying drawings, taken in conjunction with the accompanying description, in which similar characters refer to similar parts, and in which.

DESCRIPTION OF THE PREFERRED EMBODIMENT

Figure 1:
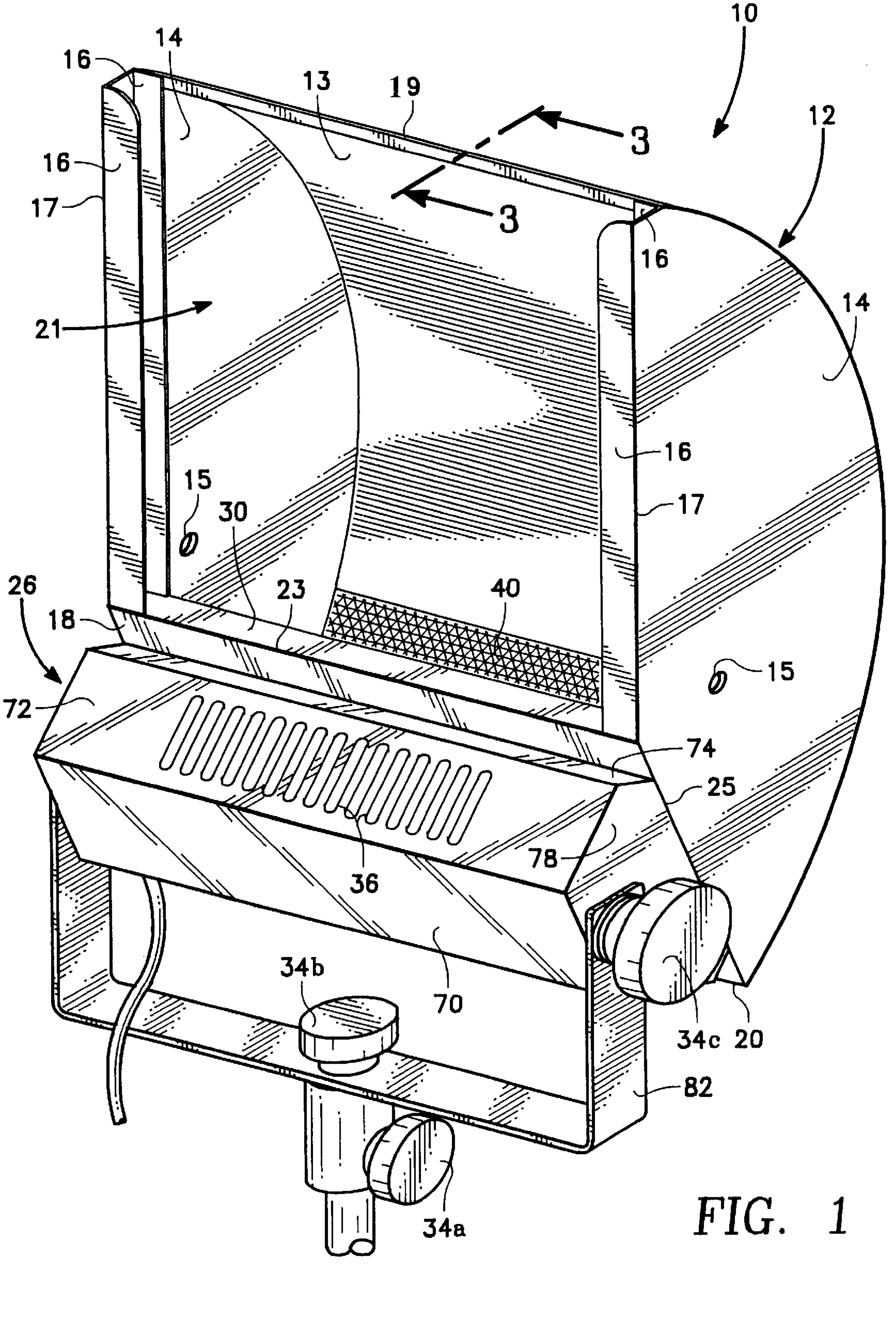
FIG. 1 is a front isometric view of the combination light assembly of the present invention.
Figure 2:
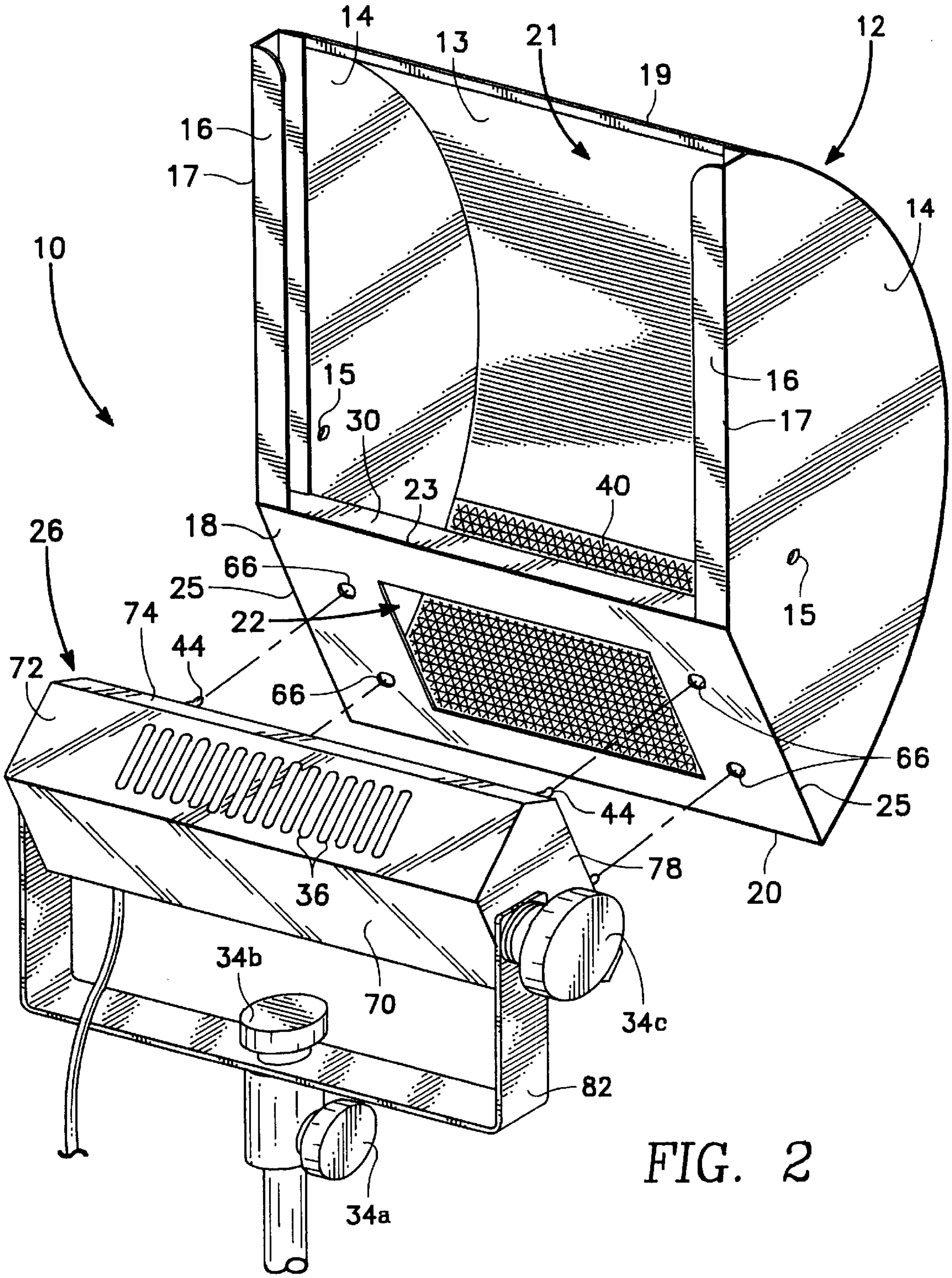
FIG. 2 is a front isometric view of the assembly of FIG. 1 showing the light source casing disconnected from the housing.

With reference now to the drawings, the combination light assembly of the present invention is shown and generally designated by reference 10. The assembly includes a housing 12 having a rear wall 13 which curves rearwardly from an upper straight edge 19 and downwardly to a lower straight edge 20. The edges are preferably parallel to each other and to the axis of curvature of the wall. The angle of curvature of the rear wall is preferably less than 180°.

Extending inwardly from the curved lateral edges of the rear wall are side walls 14, 14. The side walls are flat and mirror images of each other. They enclose the open sides of the rear wall and include a straight front edge 17 which extends downwardly from rear wall upper edge 19 to front corner 23. The side walls include lower straight edges 25, 25 that incline inwardly from the front corner to the rear wall lower edge 20.

The front edges 17, 17 have a longitudinal extent that is preferably greater than the length of lower edges 25, 25. In conjunction with upper edge 19 and front corner 23, a rectangular shaped upper opening 21 is defined to permit passage of reflected light in a manner to be hereinafter described.

The front corner 23, opposing lower edges 25, 25 and lower end 20 outline an open rectangular area which is bordered by a corresponding framework shown as inner frame 18. The midportion of the inner frame is provided with a lower opening 22 for allowing passage of direct light from an adjacent light source to be described below. The inner frame 18 has two opposing side panels, each one of which is provided with one or more spaced-apart attachment openings 66.

Projecting inwardly from each rear wall edge 17, 17 are a pair of narrow spaced-apart vertically aligned guide strips 16, 16. The guide strips extend from upper edge 19 downwardly to a narrow spacer part 30 that is directed rearwardly from the longitudinal extent of front corner 23. The guide strips are spaced-apart a predetermined distance that is sufficient to define a guide slot for accommodating corresponding attachment portions of light shields, screens, deflectors, filters, lenses and the like.

Figure 3:
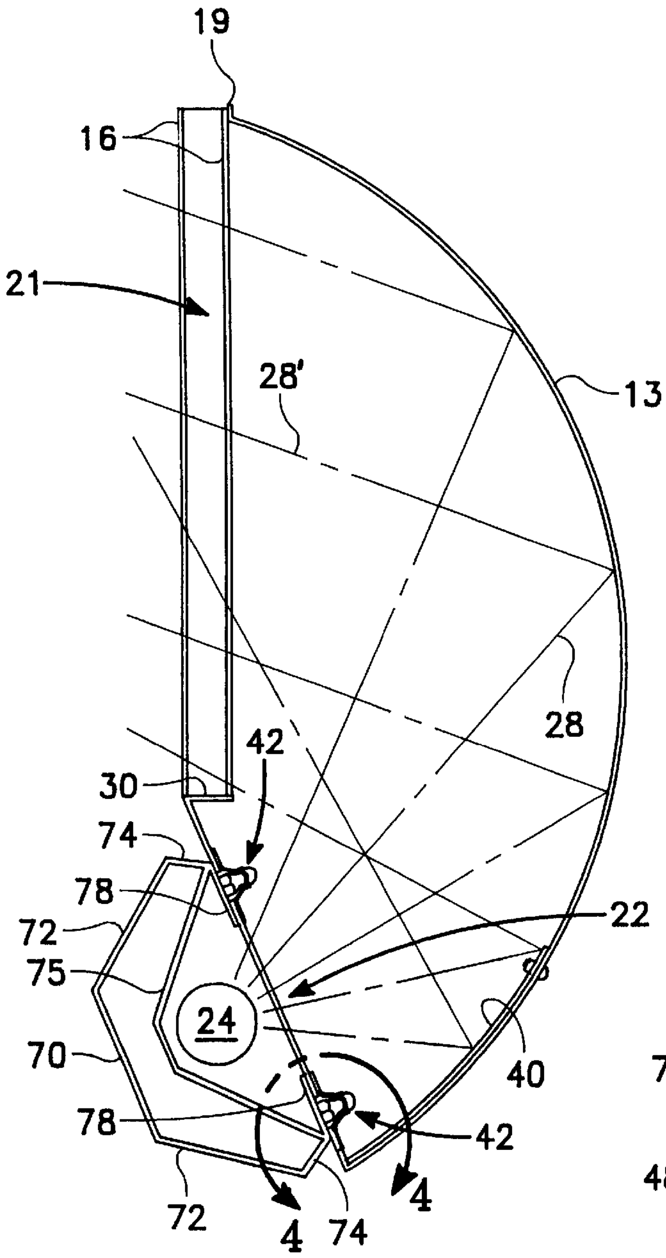
FIG. 3 is a cross-sectional view taken along lines 3—3 of FIG. 1.
Figure 6:
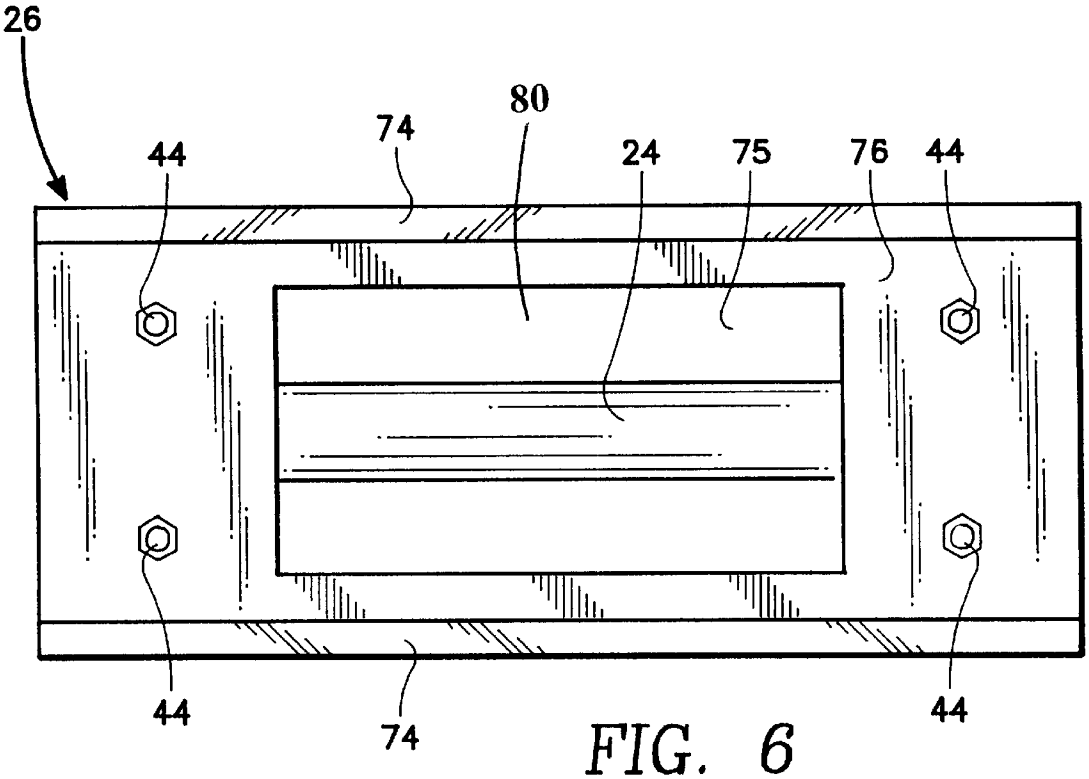
FIG. 6 is a top plan view of the casing shown in FIG. 1.
Figure 7:
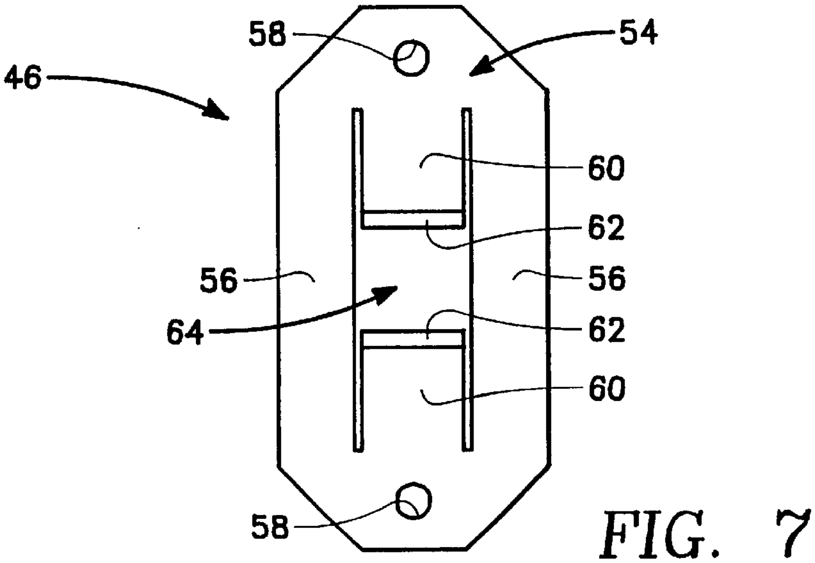
FIG. 7 is a top plan view of the fastener component shown in FIG. 5.

The assembly 10 further includes a light source 24 which is best seen in FIGS. 3 and 6. The light source is longitudinally mounted within a casing 26 that is attachable to the housing. The casing has a trough-like structure comprising an elongated bottom 70 from which extend opposing angular walls 72, 72. Turned inwardly from the outer end of each angular wall are support strips 74, 74.

Overlying opposing end portions of each strip is an attachment panel 76, 76. Each panel is fixed to a respective strip. Inner edges of each opposing attachment panel and each support strip define a light passage 80 through which direct light passes that when light source 24 is activated. Preferably, the casing interior includes a liner 75 for efficient light reflection and thermal insulation.

Opposing ends of casing 26 are enclosed by end plates 78, 78. The end plates provide support for connection of yoke 82 and related light support means via adjustment knobs 34*a, b,c*. In a similar manner, each housing side wall 14 may include a respective orifice 15 for engaging a variety of the aforementioned light support means.

To facilitate dissipation of heat energy emanating from light source 24, at least one of the angular walls 72, 72 may be provided with air vents 36. This feature will prolong light source life and minimize the danger of a user being burned.

When casing 26 is mounted to the housing 12, the light source 24 will be directly in front of lower opening 22. With this configuration, light beams 28 will radiate from the light source, pass through light passage 80 and then pass into the housing through the lower opening. Upon impinging rear wall 13, the light beams will be reflected as incident light beams 28'. The incident beams then exit the housing through upper opening 21. Because of the multiple reflections, the incident beams are more diffused and a soft light effect is achieved. To enhance the softening effect, the lower interior area of rear wall 13 may be covered with a reflective layer 40 of metal, ceramic or coated plastic.

Mating components of quick connect means are mounted to respective portions of casing 26 and housing 12 to provide the desired ease-of-use attributes of the invention. Such means may comprise cam and lock mechanisms, latch devices, bolts, nuts, pins, keys, clips, clamps, hooks and screws known in the art.

Figure 4:
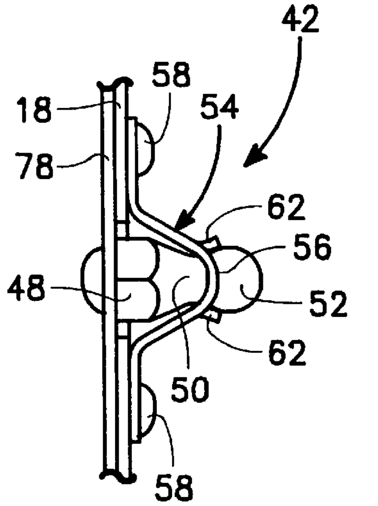
FIG. 4 is an enlarged fragmentary cross-sectional view taken along line 4 of FIG. 3 showing the post and fastener components in a connected configuration.
Figure 5:
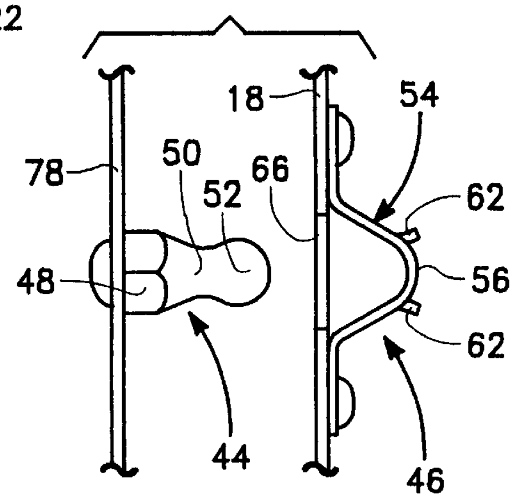
FIG. 5 is a view similar to FIG. 4 showing the post and fastener components in a disconnected configuration.

With reference now to FIGS. 4 and 5, a quick connect assembly 42 that is particularly unique and useful with the invention is shown. The basic elements comprise a post component 44 and a fastener component 46. The post component has a base part 48 fixed to the aforesaid attachment panel 76. The base part extends outwardly from the panel and merges into a reduced diameter throat region 50. The throat region terminates at a distal head portion 52.

The fastener component comprises a connector plate 54 having an upwardly bent portion 56 with a center flex opening 64. Opposing ends of the connector plate are fixed to the backside of inner frame 18 with rivets 58. The flex opening is positioned to be in alignment with the inner frame attachment openings 66.

The upwardly bent portion 56 includes two mirror image cantilevered legs 60, 60 that extend toward each other from opposite sides of the bent portion. Each leg terminates proximate the crest of the bent portion at a predetermined free end that is spaced-apart from the other. The free ends each include an upturned tab 62 and the spacing between the tabs defines flex opening 64. The tabs function as a guide means to facilitate movement of post head portion 52 into and out of the flex opening. The cantilevered legs 60, 60 are flexible and, therefore, flex opening 64 will vary in size with the amount each leg is flexed. At rest, the spacing between the tabs will be about equal to the diameter of post throat region 50.

It will be appreciated that the axial position of the throat region on post 44 will be coordinated with the distance the flex opening is spaced-apart from the backside of the inner frame. The objective is to have the casing attachment panels 76, 76 in close abutting contact with the front side of inner frame 18 when the housing and casing are connected as shown in FIG. 1.

To connect the casing to the housing, the posts 44 are inserted through corresponding frame attachment openings 66 and into the bent portion 56 of connector plate 54. As the post is urged against the cantilevered legs at the flex opening 64, the flexible legs will yield and allow the head portion to move through. Further axial movement will position throat region 50 adjacent tabs 62, as shown in FIG. 4. This action will result in attachment panels 76, 76 being directly against the front side of frame 18.

To quickly disconnect the above assembly, the casing is pulled in a direction away from the housing. The upturned tabs 62 at the ends of the cantilevered legs function to smoothly guide head portion 52 back through the flex opening and out attachment openings 66.

In the above described embodiment, the post component is attached to the casing while the fastener component is attached to the housing. It is to be appreciated, however, that the components can be reversed. Additionally, while the particular combination light assembly, as herein shown and disclosed in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. An assembly for illuminating an object comprising:

a housing having a curved rear wall and a front area with an upper opening and a lower opening; and, a casing having a light source and being detachably mounted external to and directly against said front area whereby light emitted from said light source will pass through said lower opening and be reflected out through said upper opening for indirect illumination of said object when said casing is mounted to said housing.

2. The assembly of claim 1 further comprising a quick connect means having at least one post component attached to either one of said casing and said housing and at least one fastener component attached to the other one of said casing and said housing.

3. The assembly of claim 2 wherein said post component is attached to said casing and comprises a base part that merges into a throat region from which extends a head portion.

4. The assembly of claim 3 wherein said housing includes an attachment opening and said fastener component is attached adjacent to said attachment opening.

5. The assembly of claim 4 wherein said fastener component includes a flex opening which is in alignment with said attachment opening.

6. The assembly of claim 5 wherein said fastener component comprises a connector plate having a bent portion, said flex opening being located in said bent portion.

7. The assembly of claim 6 wherein said connector plate includes two opposing flexible legs extending toward each other and terminating at respective free ends, said free ends being spaced-apart at said bent portion to define said flex opening.

8. The assembly of claim 7 wherein each of said free ends includes an upturned tab.

9. The assembly of claim 7 wherein said free ends engage said throat region when said head portion extends through said flex opening.

10. The assembly of claim 1 wherein said curved rear wall has an inner surface, said inner surface including a reflective layer.

11. A lighting system for illuminating an object comprising:

a light emitting means mounted within a casing for directly illuminating an object, said casing having an attachment panel;

a reflector means having a frame with a front area defining an-upper opening and a lower opening, said light emitting means being selectively engageable with said front area;

said front area contacting said attachment panel when said light. emitting means is engaged therewith; and, said reflector means receiving light from said light emitting means through said lower opening and reflecting said light through said upper opening for indirect lighting of said object when said front area is engaged with said casing.

12. The system of claim 11 wherein said reflector means includes a housing with a curved surface in alignment with said lower opening.

13. The system of claim 12 wherein said upper opening is in alignment with said curved surface.

14. The system of claim 13 including a quick connect means having selected components fixed to each of said housing and casing for releasably connecting together said housing and casing.

15. The system of claim 14 wherein said components comprise a post component and a fastener component which releasably interfit with each other.

16. A method for selectively illuminating an object which comprises the steps of:

providing a housing having a light reflective curved rear wall and a front area with a defined upper opening and a lower opening;

providing a light emitting source fixed within a casing and having a light outlet;

positioning said light emitting source so that said light outlet is adjacent said front area for illumination into said lower opening;

releasably securing said light emitting source to said housing so that said casing contacts said front area;

activating said light emitting source to emit light; and, directing said light through said light outlet and lower opening and against said curved rear wall.

17. The method of claim 16 including the step of aligning said curved rear wall to reflect said light out through said upper opening.

18. The method of claim 17 wherein said securing step further comprises the steps of:

attaching a post component to either of said light emitting source or said housing;

fixing a fastener component to the other of said housing or said light emitting source; and, selectively engaging said post component with said fastener component.

19. The method of claim 17 including the steps of:

connecting said light emitting source to a light support means, said connecting step to be accomplished subsequent to said aligning step; and, using said light support means to direct said light in a selected direction.

* * * * *